Dec. 14, 1971   C. E. ABBOTT ET AL   3,626,583
THERMOELECTRIC DEVICE
Original Filed April 3, 1964   4 Sheets-Sheet 1
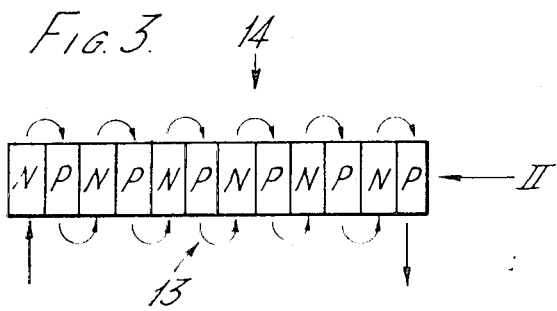
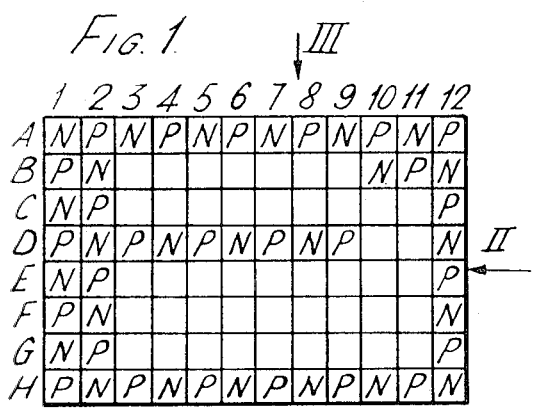
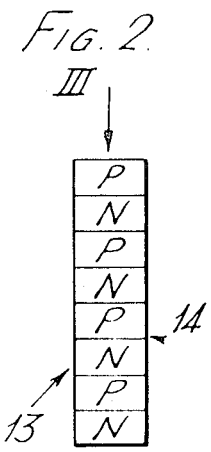
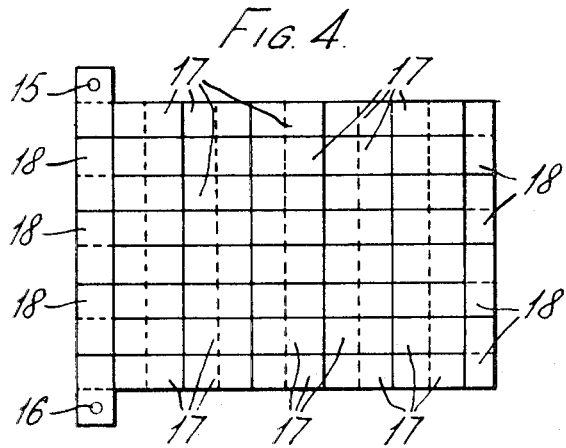
INVENTORS
C. E. Abbott
G. A. Barnes
J. F. A. McEntee
BY   Hood, Gust & Irish
ATTORNEYS

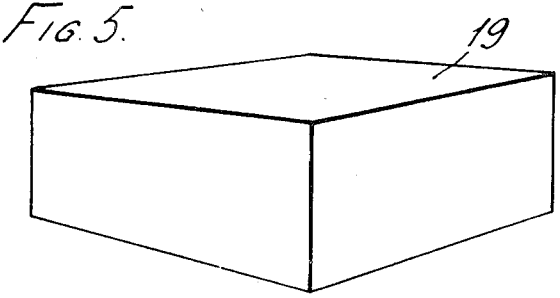
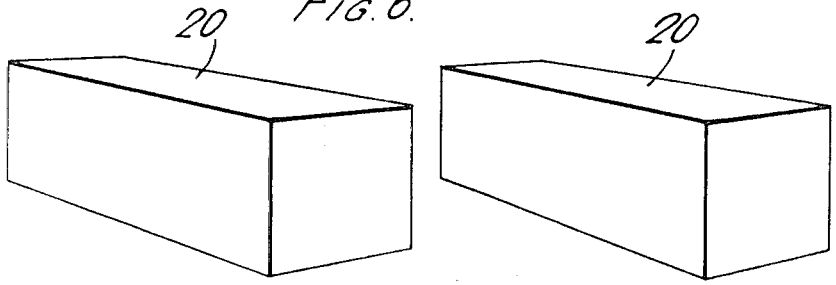
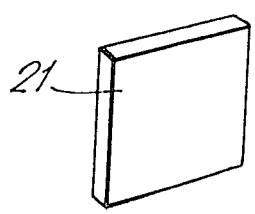
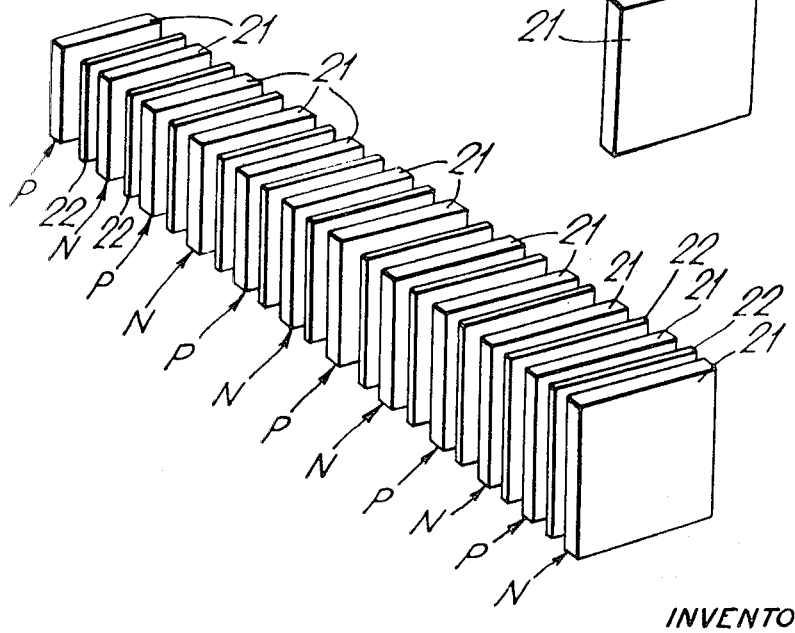
INVENTORS
C. E. Abbott
G. A. Barnes
J. F. A. McEntee
BY  Hood, Gust & Irish
ATTORNEYS

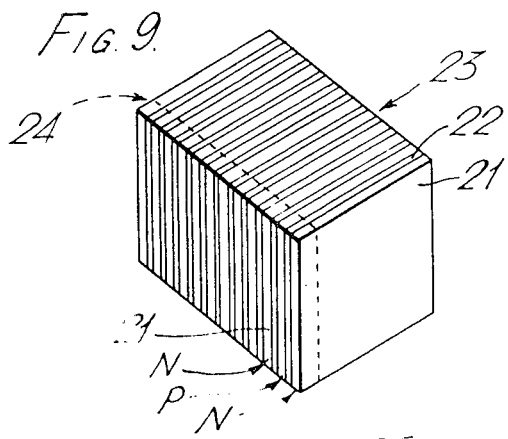
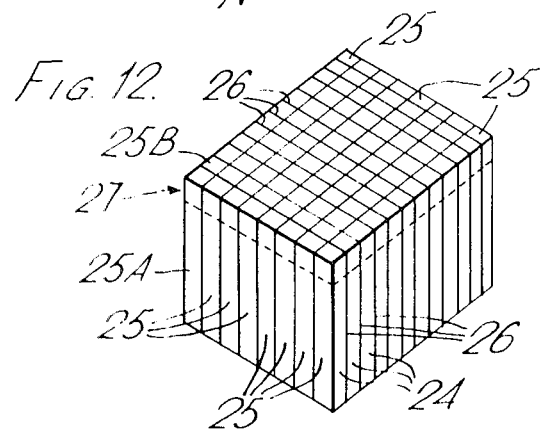
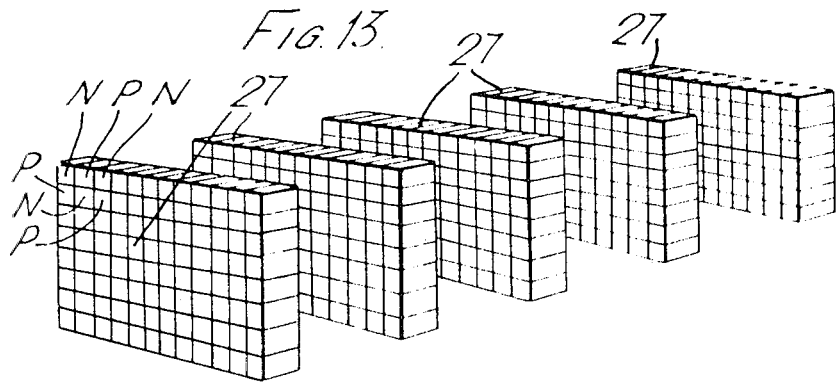

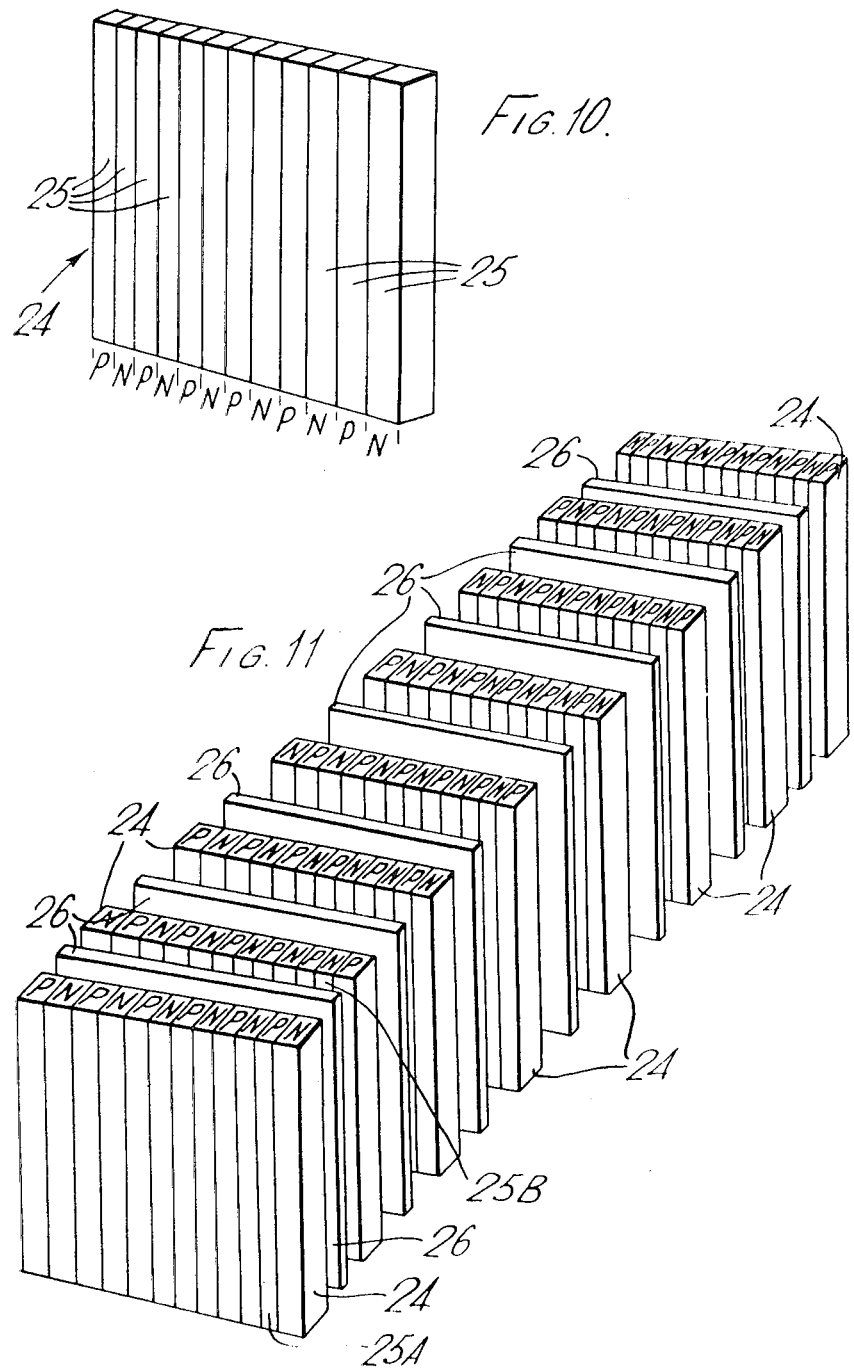

United States Patent Office 3,626,583
Patented Dec. 14, 1971

3,626,583
THERMOELECTRIC DEVICE
Colin Edward Abbott, Windsor, Guy Anthony Barnes, Earley, Reading, and John Francis Anthony McEntee, Greenford, Middlesex, England, assignors to Mining & Chemical Products Limited, London, England
Continuation of application Ser. No. 357,225, Apr. 3, 1964. This application June 18, 1969, Ser. No. 868,659
Claims priority, application Great Britain, Apr. 5, 1963, 13,612/63
Int. Cl. B01j *17/00;* H01l *15/00*
U.S. Cl. 29—573                           14 Claims

ABSTRACT OF THE DISCLOSURE

A method of making a thermoelectric device comprising the steps of providing pieces of p type material and n type material, respectively, cutting these pieces into first flat slices, securing the p and n slices together in alternating relation thereby forming a first composite unit which begins and ends with p and n slices, respectively, cutting said first units normal to said first surfaces into second and third slices, respectively, securing the second and third slices together with the p and n slices in alternating relation thereby forming a third composite unit, cutting said third unit normal to said first, second and third surfaces into slab-like matrices having a plurality of p and n type elements, insulating said elements from each other and conductively connecting said elements together in a predetermined manner.

---

This application is a continuation of copending application Ser. No. 357,225 filed Apr. 3, 1964, now abandoned.

This invention relates to an improved thermoelectric device of the type having one or more than one pair of thermoelements, each pair having one p type thermoelement and one n type thermoelement, which pair will be herein called a thermocouple. In a device of this type the thermoelements are electrically insulated from one another, and further the thermoelements of each thermocouple are connected together by an electrical connection and, in the case where the device has two or more thermocouples, adjacent thermocouples are connected together by electrical connections. Such devices operate using the Peltier effect for cooling or the Seebeck effect for generating an electric current.

In a thermoelectric device which operates using the Peltier effect or the Seebeck effect it is a desirable feature to keep the heat flow across the device, via the insulation between the thermoelements, as low as possible, for example below 5% of the total heat conducted across the device by semi-conducting action, and preferably below 2%. Another desirable feature is to keep the overall size of a device small in relation to its performance.

Most known thermoelectric refrigerating devices operate at a relatively high current, say 10 to 20 amperes, and it is another desirable feature to reduce the current requirement. Likewise most thermoelectric generator devices have a lower output voltage and it is another desirable feature of the invention to increase the voltage output. It is among the objects of this invention to provide a device having these desirable features.

Thermoelectric devices of the type referred to are known, for instance for specialized cooling applications, using the Peltier effect. It is usual to make such devices by forming a matrix, block or module of small cubes or cuboids of n and p thermoelements insulated from one another by a bonding insulating material or air, and having electrical connections in the form of small metallic links or bridges soldered on to the faces of the thermoelements. The soldering technique is not very conducive to rapid production and in particular the heat at the faces of the thermoelements produced by soldering can cause diffusion of the connecting metal (usually copper) into the semiconductor material of the thermoelements. Such diffusion in effect "poisons" the material and can reduce its effectiveness considerably. Further, present manufacturing techniques are such as to provide relatively large spaces between the thermoelements and the heat loss across the device via the insulating medium filling these spaces may be large. In a device in accordance with the present invention soldering is not used, and the spaces between the thermoelements are not more than 0.5 mm.

In this specification "good electrical conductor" means a conductor having a resistivity of less than 10.0 microohms-cm. at room temperature. "High thermal conductivity" means a conductivity of not less than 0.1 calorie per cm. per second per ° C. "Low contact resistance" means a contact resistivity of the order of $10^{-5}$ ohms-cm.$^2$, as discussed in "Thermoelectric Materials and Devices" published by Reinhold Publishing Corporation, and in "Semiconductor Thermoelements and Thermoelectric Cooling" by Ioffe, published by Infosearch Ltd.

According to this invention a thermoelectric device of the kind referred to is characterised in that each electrical connection is formed by a link which (i) is a good electrical conductor; (ii) is of high thermal conductivity; and (iii) has been applied to the thermoelements at a temperature not inexcess of 100° C. at the faces thereof and in such a manner as to ensure a low contact resistance between the link and the thermoelements. Also in accordance with the invention a thermoelectric device of the kind referred to may be characterised in that each electrical connection is formed by a link which (i) is a good electrical conductor; (ii) is of high thermal conductivity; and (iii) has been applied to the thermoelements by a chemical deposition or by electrodeposition and in such a manner as to ensure a low contact resistance between the link and the thermoelements.

The invention includes a method of making a thermoelectric device of the kind referred to, which comprises the step of forming each electrical connection by applying a link to the thermoelements at a temperature not in excess of 100° C. at the faces thereof and in such a manner as to ensure low contact resistance between the link and the thermoelements, the link being a good electrical conductor and of high thermal conductivity.

The invention may include a method of making thermoelectric devices of the kind referred to, comprising the steps of: cutting blocks of p and n type material (for example bismuth telluride) into first slices; forming a first unit of parallel alternate p and n first slices bonded together; cutting the said first unit in planes normal to the planes of the said first slices to form composite slices; forming a second unit of parallel composite slices bonded together; cutting the said second unit in planes normal to the planes of the said first slices and also normal to the planes of the composite slices so as to form slab-like matrices each comprising a number of adjacent thermocouples, and forming the electrical connections.

A thermoelectric device in accordance with the invention ,and the preferred method of making it, will now be described in more detail by way of example, with reference to the accompanying diagrammatic drawings.

FIG. 1 is a diagrammatic elevational view of the front or "near end" of an embodiment of this invention;
FIG. 2 is an edge view thereof;
FIG. 3 is another edge view;
FIG. 4 is a view similar to FIG. 1 illustrating one of the processing steps in this invention;

FIG. 5 illustrates in perspective an ingot of either p or n type alloy material;

FIG. 6 is a perspective view of two blocks obtained by cutting the block of FIG. 5 into two blocks;

FIG. 7 is a perspective illustration of a slice of material cut from one of the blocks of FIG. 6;

FIG. 8 is an exploded view illustrating one of the steps in assembling a product of this invention;

FIG. 9 is a perspective view of the assembly of FIG. 8 but adhered together in an assembled unit;

FIG. 10 is a perspective view of a slice of the unit of FIG. 9;

FIG. 11 is a perspective view in exploded form of another assembly step in this invention;

FIG. 12 is a perspective view similar to FIG. 11 but with all of the parts adhered together; and FIG. 13 is a perspective view of several slabs or slices cut from the block or unit of FIG. 12.

The method described below is one which produces a number of matrices, each having 96 small thermoelements of semiconductor material arranged in 12 rows of 8 thermoelements each. All the small thermoelements are alternately p and n. For convenience of description, thermoelements will be subsequently referred to simply as "elements." All the elements are of bismuth telluride alloys, although other alloys may be used.

FIG. 1 is a digrammatic end view of such a matrix. It shows what may be called for convenience the "near end." Also for convenience, only some of the n and p designations have been inserted. As will be seen there are 8 horizontal rows (marked A to H) of 12 elements or 6 thermocouples each. The vertical rows are marked 1 to 12. Thus the elements can be identified in the fashion of a map reference; for instance the n element fourth from the right in the top row is A9. The lines which demarcate the elements and the thermocouples also indicate the planes along which the elements and thermocouples are bonded together with an electrically insulating material, as will be described.

FIG. 2 is a diagrammatic side view, looking in the direction of arrow II in FIGS. 1 and 3. The "near end" is indicated by reference numeral 13, the "far end" by 14. If drawn as a separate figure, the far end would be the mirror image of FIG. 1.

FIG. 3 is a diagrammatic top view, looking in the direction of arrow III in FIGS. 1 and 2.

Every one of the 96 elements is insulated from its neighbour, as are also the 48 thermocouples. To produce the desired thermoelectric action, a current is passed through the elements and thermocouples in series.

Current is supplied (the electrical connections will be described below) firstly to the near end of element A1. Current leaves A1 at the far end and passes to the far end of A2, thence from the near end of A2 to the near end of A3, thence from the far end of A3 to the far end of A4 and so on along row A, as diagrammatically suggested by arrows in FIG. 3. From the near end of A12 current passes to the near end of B12, thence from the far end of B12 to the far end of B11, thence to the near end of B11 to the near end of B10 and so on along row B. At the near end of B1 current passes to the near end of C1. The cycle is repeated row by row until the current leaves at H1.

To make all these connections between the ends of the elements, a copper layer is deposited on the near end 13, and another copper layer is deposited on the far end 14. The layers are etched to the desired commutation, as will be described.

FIG. 4 shows the commutation for near end 13. It includes an input link 15 and an output link 16. It also includes a number of other links 17 and 18, links 17 connecting element ends in the horizontal direction, and links 18 connecting element ends in the vertical direction at the ends of rows A to H. The full lines in FIG. 4 demarcate the links and also indicate the insulating portions of the commutation. The dotted lines in FIG. 4 assist in showing the positions of the element ends, which, in the complete matrix, are covered by the cummutated copper.

The commutated copper on the far end simply has horizontal links like links 17, connecting the far ends of adjacent n and p elements, as described above. All the vertical links are made at the near end of the matrix.

Thus, considering FIGS. 1 and 4, current enters at 15, passes into near end of A1, thence from far end of A1 via the links at that end to the far end of A2, thence via link 17 to A3, thence to the far end and via the link there to A4, thence via another link 17 to the near end of A5, and so on, backwards and forwards along the elements of row A. At the near end of A12, the current passes via link 18 to the front end of B12, and thence again via the links of row B to B1; thence via a link 18 to C1, and so on, until finally all the elements have been traversed and current leaves from the front end of H1, at link 16.

The preferred method of manufacture will now be described.

FIG. 5 shows a block or ingot 19 of p or n type bismuth telluride alloy.

The p type block 19 is cut into two blocks 20 (FIG. 6) each of square cross section. Obviously a number of p type blocks 19 can be handled at one operation, on a production basis. An n type block 19 is similarly cut into two n type blocks 20. For clarity of description, the operations on two blocks 20, will be described, for producing a small number of matrices. The method can be enlarged for operation on a production basis. Also for clarity of description, the various steps of the method will now be numbered.

(1) A p type block 20 is mounted in wax on a steel or ceramic plate and cut into a number of slices using a diamond or silicon carbide wheel rotating at 6500 r.p.m.

(2) The p type slices are lapped to accurate, flat slices, one of which, marked 21, is seen in FIG. 7.

(3) A like number of n type slices 21 is made in the same way.

(4) Six p type and six n type slices 21 are taken from those produced by the preceding operations.

(5) The twelve slices 21 are arranged sandwich fashion, with p and n slices alternating (FIG. 8) with adjacent slices separated by an insulating bonding material 22 whose thickness is less than 0.5 mm. and which is of low thermal conductivity and low electrical conductivity. (A suitable material is varnished Melinex (registered trademark) film).

(6) The "sandwich" is clamped in a jig and baked in an oven until the bonding material has set hard. The resulting sandwich or first unit 23 is seen in FIG. 9.

(7) The bonded first unit 23 is removed from the oven, cooled, and is then mounted in wax on a steel or ceramic plate and cut into slices, the plane of one cut (as indicated by the dotted line) being normal to the planes of slices 21 of first unit 23. In this way a number of composite slices are produced; these composite slices are lapped to accurate, flat slices 24 (FIG. 10). Each composite slice 24 will be composed of twelve sticks 25 of n and p material arranged alternately, as in FIG. 10, sticks 25 being separated by the bonding material.

(8) Eight such composite slices 24 are then arranged as shown in FIG. 11, adjacent slices being separated by insulating bonding material 26, as previously described. It is important in this step of the method that the composite slices 24 are arranged so that p sticks 25 in one composite slice abut n sticks 25 in the next composite slice. In other words, viewing the nearest composite slice 24 in FIG. 11, stick 25A is a p type stick and stick 25B of the next composite slice is an n type stick, and so on, throughout the whole assembly.

(9) The assembly of composite slices 24 and insulating bonding material, as shown in FIG. 11, is clamped in a jig, baked in an oven, removed, and cooled. The bonded assembly or second unit is shown in FIG. 12.

(10) The second unit (consisting of eight slices 24, each having 12 sticks 25, with sticks of p and n types alternating throughout the assembly) is mounted on a steel or ceramic plate and cut into five matrices 27, as shown in FIG. 13 and as indicated by dotted lines in FIG. 12. Each matrix has the form shown in FIGS. 1 to 3. This is the third cutting operation and it will be seen that it is in planes normal to both the previous cutting planes. In other words, the three cutting operations are carried out in three different planes (or series of planes) mutually perpendicular. A typical matrix in accordance with the invention has dimensions 0.775 x 0.515 x 0.155 inch.

The matrices now having been produced, it is necessary to deposit on the near and far faces of each the commutated copper layers to form the links 17 and 18.

(11) Each matrix 27 has its near and far faces lapped flat and cleaned, by mechanical abrasion and by use of a liquid.

(12) A small amount of a fusible alloy, for example gallium indium eutectic (which is liquid at room temperature) is smeared over the cleaned near face, which is then pressed against the flat face of a copper electrode. (On a production basis, a number of matrices would be treated in one operation, by being pressed against one electrode).

(13) The exposed parts of the electrode and the exposed edges of the matrix are masked off, and then immersed in an electroplating nickel solution until nickel plating has been deposited on the exposed far face of the matrix, to a depth of for example 0.0005". The electrode and matrix are removed from the plating solution and rapidly rinsed in water and immediately immersed in an electroplating copper solution. When copper, also to a depth of for example 0.0005", has been deposited over the deposited nickel plating (which forms an intermediate bond between the bismuth telluride and the copper and assists in preventing diffusion of the copper into the bismuth telluride), the electrode and matrix are removed and dried carefully.

(14) A colloidal conducting material, for example a graphite solution, is brushed or sprayed onto the copper-plated far face of the matrix so that all grooves or non-conducting parts of the far face are bridged by the graphite, which is a good conductor. Excess graphite is removed by swabbing with a solvent, in such manner that cracks or fissures in the copper-plated far face retain the graphite, but the flat smooth portions of the face present a clean appearance.

(15) The electrode and matrix are put in the electroplating copper solution once again, so as to deposit more copper until the graphite-filled cracks or fissures are bridged by the copper plating, to a thickness of for example 0.003 inch.

(16) The electrode and matrix are removed from the copper solution; the matrix is separated from the electrode; the gallium-indium metal is swabbed from the now-exposed near face, using a solvent; the copper-plated far face is lapped flat.

(17) The matrix is reversed, and steps 12 to 16 carried out again, to plate the near face with copper.

(18) The matrix is coated evenly with a photo resist resin, for example by spraying or brushing, and is allowed to dry. The matrix (in production a number of matrices) is put into a jig which carries a mask of the required commutation for one face, and then exposed to ultraviolet light. This procedure is repeated with another mask for the other face.

(19) The exposed matrix is then put into a developer solution until the commutation images are developed, when the matrix is quickly rinsed, dried and immersed in for example ammonium persulphate solution until the copper is etched away in accordance with the required commutations. The matrix is again rinsed and dried.

(20) One commutation is shown in FIG. 4, and the other is similar, as has been explained. Finally, lead wires are soldered or spot welded to terminal links 15 and 16.

(21) The matrix can be encapsulated between two anodized aluminum plates which are bonded to the matrix by a thin layer of synthetic resin, for example "Araldite" (registered trademark), with the anodization, provides the required insulation. Alternatively, or in addition, the matrix can be surrounded by a frame of such synthetic resin.

The heat conductance across the matrix is kept low by making the insulating bonds as thin as practicable, for example 0.005" thick. The plating and commutation technique described, using copper, gives a very low contact resistivity, of the order of $10^{-5}$ ohms-cm.$^2$. Copper is of course a "good electrical conductor" as herein defined, and has a high thermal conductivity, also as herein defined.

The plating and commutation technique described is carried out at relatively low temperature, below 100° C. at the thermoelement faces, and usually at about 60° C., so that diffusion of the copper into the bismuth telluride (or diffusion of another conducting metal into another semi-conducting material) is avoided or substantially reduced.

The impedance of the device described is relatively high (of the order of 2 to 2.5 ohms) in contrast to the low impedances of known devices, so that the device described will operate as a refrigerator device at a lower current or alternatively deliver a relatively large voltage when used as a generator.

What is claimed is:
1. In a method of making a thermoelectric device which includes a plurality of thermoelements secured together in a unitary structure, the steps of (a) providing substantially equal sized, rectangular bodies of p and n type material, respectively, which are larger than said thermoelements; (b) assembling and bonding said p and n bodies together in alternating, stacked relationship to form a first rigid unitary block of alternating p and n bodies; (c) cutting said first block into a plurality of slices along planes transverse to the surfaces of said bodies which face each other thereby providing both p and n elements in each slice; (d) assembling and bonding said slices together in stacked relationship in which the cut surfaces are juxtaposed and said p and n elements are alternated and juxtaposed thereby to form a second rigid unitary block; (e) and conductively connecting said p and n elements together in a predetermined circuit arrangement.

2. The method of claim 1 in which said cutting is performed in planes parallel to each other and normal to said facing surfaces, said slices being of substantially equal thickness.

3. The method of claim 1 in which said bodies are relatively thin slices having opposed parallel surfaces, the bodies being assembled with the surfaces thereof juxtaposed in said first block, said cutting being performed in planes parallel to each other and normal to said parallel surfaces, and connecting said p and n elements together in a thermocouple circuit arrangement.

4. A method of making a thermoelectric device comprising the steps of providing pieces of p and n type material, respectively, cutting said pieces into first slices having first surfaces formed by said cutting, forming a first unit of parallel alternate p and n first slices secured together with said surfaces opposed, cutting said first unit in planes normal to said first surfaces into second slices to form composite slices of alternate p and n elements, securing said second slices together with the p and n elements of adjacent slices in alternating relation and with the surfaces thereof opposed thereby forming a second composite unit, cutting said second unit in planes normal to said surfaces into slab-like matrices having a plurality of alternate p and n type elements, insulating said elenents from each other, and conductively connecting said elements together in a predetermined manner.

5. A method of making a thermoelectric device comprising the steps of providing a plurality of blocks of p and n type material, cutting said blocks into a plurality of planar p and n first slices with first opposite surfaces formed by said cutting, lapping said first surfaces to be substantially planar and parallel to each other, bonding said p and n first slices together in alternating relation with electrical and thermal insulating material for forming a first unit, cutting said first unit perpendicularly to said first slices to form second slices, lapping the cut surfaces of said second slices to be substantially planar and parallel to each other, bonding said second slices together with the p and n elements thereof in alternating relation with electrical and thermal insulating material for forming a second unit, cutting said second unit perpendicularly to the surfaces of said first and second slices to form a plurality of slab-like matrices comprising a plurality of p and n elements insulated from each other, said matrices having third surfaces formed by said last-mentioned cutting, lapping said third surfaces of said matrices to be substantially planar and parallel to each other, depositing a nickel layer onto the p and n portions of said third surfaces, depositing a first copper layer over said nickel layer, filling any fissures in said first copper layer with a colloidal conducting material, depositing a second layer of copper over said first copper layer and said colloidal material thereby covering the third surfaces, selectively etching said second copper layer thereby to provide predetermined interconnection between said p and n elements, and conductively connecting lead wires to the etched copper layer for connecting said matrix to a current-producing means.

6. The method of claim 5 further comprising the steps of coating said matrix with a thin layer of resin and encapsulating said matrix between two metallic plates which are bonded to and insulated from said matrix by said resin.

7. The method of claim 5 wherein said etching step further comprises the steps of coating said second copper layer with a "photo-resist" material, covering said "photo-resist" material with a commutation mask, exposing said coating of "photo-resist" material to light, developing the commutation images formed by said exposure, dissolving away the unexposed "photo-resist" coating, and dissolving away said second copper layer in registry with the unleveloped portion of said "photo-resist" coating.

8. The method of claim 4 wherein said cutting steps further comprise the steps of mounting said blocks, respectively, in wax thereby forming a composite wax-block, cutting said wax block, and removing said wax.

9. The method of claim 5 wherein said insulating material between bodies and slices is less than 0.5 millimeter thick.

10. A method of making a thermoelectric device comprising the steps of providing pieces of p type material and of n type material, cutting said pieces into first slices having first surfaces formed by said cutting, forming a first laminated unit of alternate p and n first slices, cutting said first unit across said first surfaces into second slices having second surfaces formed by said last-mentioned cutting, forming a second laminated unit of said second slices with the p portions of each second slice opposite the n portions of the adjacent second slices, and cutting said second unit across both said first and second surfaces into third slices thereby forming slab-like matrices of p and n sections which form thermocouples.

11. A method of making a thermoelectric device comprising the steps of providing pieces of p and n type material, cutting said pieces into first planar slices, forming a first unit of alternate p and n first slices, cutting said first unit in planes across the planes of said first slices into second slices, forming a second unit of said second planar slices with the p and n elements alternately arranged, cutting said second unit in planes across both planes of said first and second slices into third slices thereby forming slab-like matrices each of which has a plurality of adjacent alternated p and n elements, insulating said elements from each other, plating a layer of conductive material on the ends of said elements, and selectively etching said layer thereby to provide predetermined interconnections between said elements.

12. The method of claim 11 wherein said plating of said layer on said elements is by deposition at a temperature less than 100 degrees centigrade, said insulating step is performed at the same time as the forming of said first and second units, and said elements are spaced-apart less than 0.5 millimeter.

13. The method of claim 11 wherein said plating of said layer comprises depositing first a coating of nickel on said elements, then a coating of copper on said nickel thereby forming a first layer thereon, filling the cracks, voids, and grooves in said first layer with a conductive material, and depositing a second layer of copper on said first layer and said conductive material.

14. The method of claim 13 wherein said conductive material is colloidal graphite.

References Cited

UNITED STATES PATENTS

| | | | |
|---|---|---|---|
| 2,743,506 | 5/1956 | Solow | 29—583 |
| 2,752,662 | 7/1956 | Crooks et al. | 29—580 UX |
| 2,978,804 | 4/1961 | Soper et al. | 29—580 UX |
| 3,235,428 | 2/1966 | Naymik | 29—580 UX |
| 3,274,454 | 9/1966 | Haberecht | 29—576J UX |
| 3,276,105 | 10/1966 | Alais et al. | 29—573 |
| 3,290,760 | 12/1966 | Cave | 29—580 UX |

JOHN F. CAMPBELL, Primary Examiner

W. TUPMAN, Assistant Examiner

U.S. Cl. X.R.

136—212; 29—583; 136—211